H. B. ANDERSON.
FRICTION REVERSING MECHANISM.
APPLICATION FILED DEC. 21, 1908.
1,032,174.
Patented July 9, 1912.
2 SHEETS—SHEET 1.
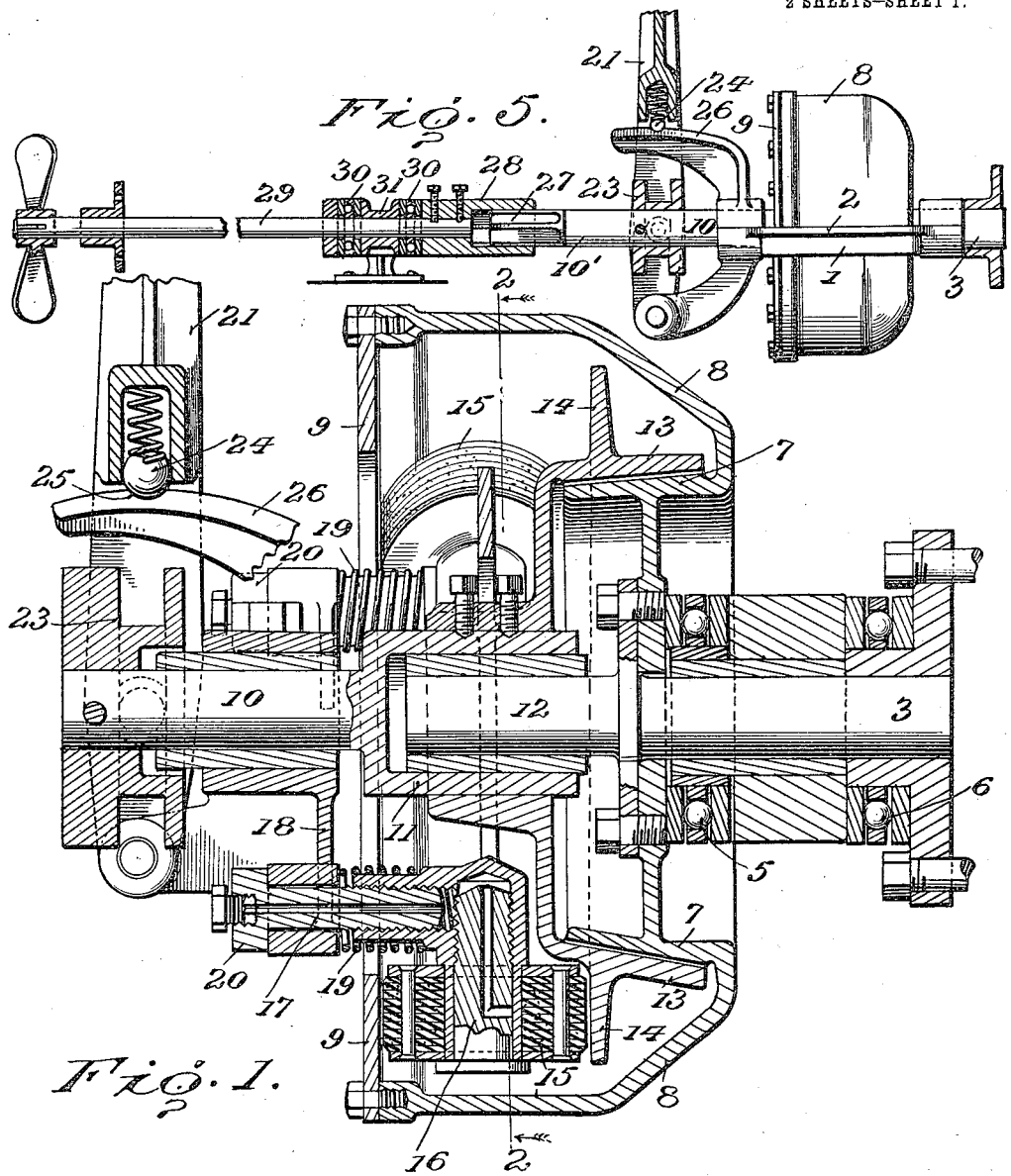

H. B. ANDERSON.
FRICTION REVERSING MECHANISM.
APPLICATION FILED DEC. 21, 1908.
1,032,174.
Patented July 9, 1912.
2 SHEETS—SHEET 2.
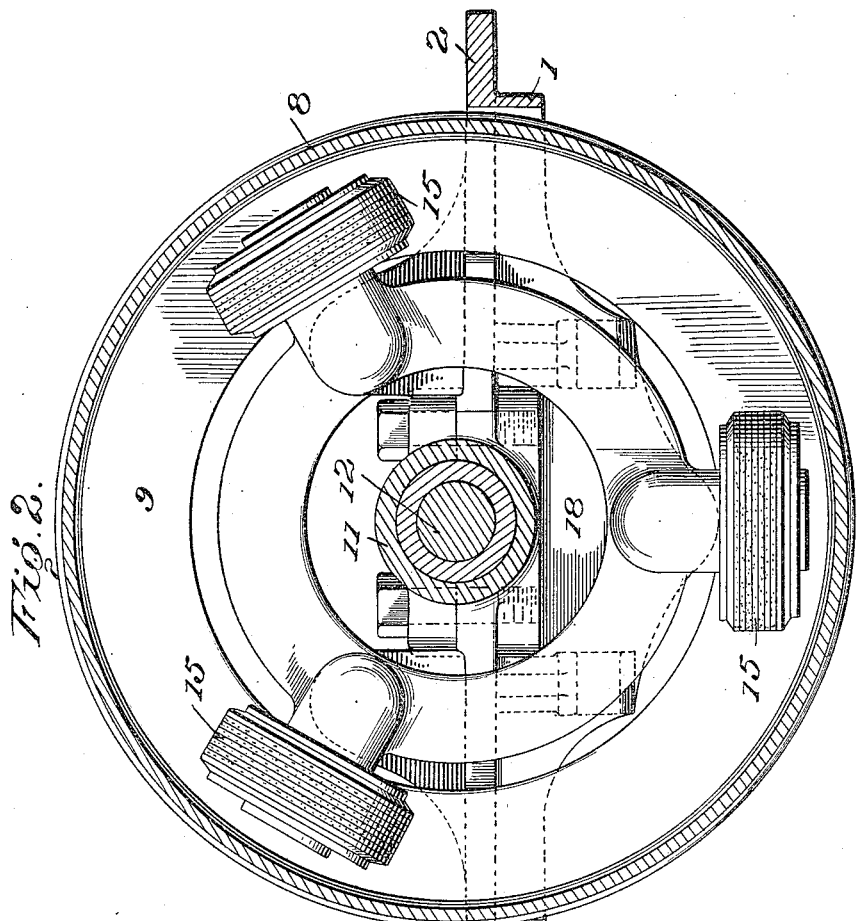
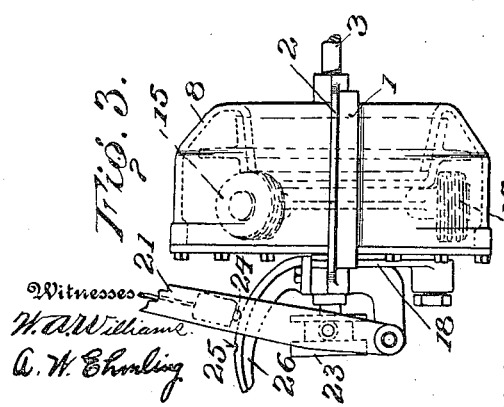
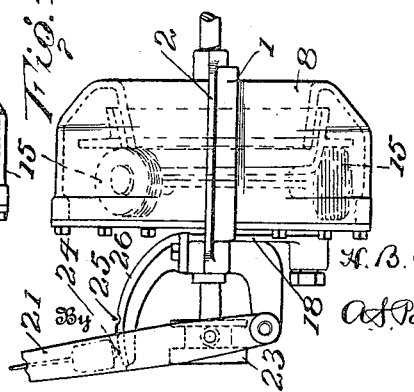
Inventor
H. B. Anderson,
A. S. Pattison,
Attorney
Witnesses
W. A. Williams
A. W. Ehrling

UNITED STATES PATENT OFFICE.

HAROLD B. ANDERSON, OF CLEVELAND, OHIO, ASSIGNOR OF ONE-HALF TO CHARLES W. CHURCHILL, OF CLEVELAND, OHIO.

FRICTION REVERSING MECHANISM.

1,032,174. Specification of Letters Patent. Patented July 9, 1912.

Application filed December 21, 1908. Serial No. 468,591.

*To all whom it may concern:*

Be it known that I, HAROLD B. ANDERSON, a citizen of the United States, residing at Cleveland, in the county of Cuyahoga and State of Ohio, have invented certain new and useful Improvements in Friction Reversing Mechanism, of which the following is a specification, reference being had therein to the accompanying drawing.

This invention relates to improvements in friction reversing mechanism, which is especially designed for use in motor boats, the primary object of which is to provide a simple, noiseless transmission.

Another object of my present invention is to construct the mechanism so that the push of the propeller wheel of the boat will force and hold together the friction members when driving the boat either forward or backward.

In the accompanying drawings, Figure 1, is a transverse, central, sectional view of the present improvement. Fig. 2, is a face view of the member carrying the reversing rollers, and the reversing rollers. Fig. 3 is a view showing the controlling lever in position for moving the boat forward, the mechanism being shown in dotted lines in corresponding position. Fig. 4, is a view similar to Fig. 3 with the controlling lever and the transmission mechanism in position for rotating the propeller in the reverse direction for causing the boat to move backward. Fig. 5, is a view (partly in section) of a modified construction of the invention.

Referring now to Figs. 1, 2 and 3 of the drawings, a suitable frame 1 is provided, and this frame at a suitable point has a horizontal flange 2 by means of which it is bolted to supporting points or blocks in the boat. A drive shaft 3 is suitably connected with an engine shaft. This shaft 3 is provided at its inner end with a suitable thrust-bearing 5 to receive the forward thrust of the propeller wheel, and a thrust-bearing 6 to receive the backward thrust of the propeller. Attached to the shaft 3 is a cone-shaped friction member 7, and this cone-shaped member 7 has a rearwardly-extending portion 8 which projects from the forward edge of the cone member and terminates in a friction portion or plate 9, which is here shown as a separate piece bolted to the portion 8. As here shown this part 8 is in the form of a continuous housing, apart from the cone center, though this may be varied, the main object being the provision of two friction members attached to the driving shaft 3, one serving as a forward drive friction member and the other as a reverse drive friction member. A shaft 10 is suitably connected with the propeller shaft, and the inner end of this shaft 10 is provided with a socket 11 which receives the inner extension 12 of the shaft 3, thus forming a bearing for the adjacent ends of the shaft by this telescopic arrangement. Attached to the inner end 11 of the propeller shaft 10 is a co-acting cone-shaped member 13, and this member is provided with a laterally-extending friction flange 14 which extends parallel with the friction plate or flange 9 but apart therefrom.

A plurality of friction rollers 15 are located between the flanges 9 and 14 with their axes at right angles to the axes of the propeller and driving shafts. Each of these rollers is journaled upon a bearing 16 which has its lower end 17 projecting rearwardly and passes through and is supported in a suitable member or spider 18. The normal positions of these rollers 15 are out of contact with the flanges 9 and 14, as shown in Fig. 1, the springs 19 serving to hold them to their inward limit of movement, and the projections 20 serving to limit their inward movement. These springs will permit the bearings, and consequently the rollers 15 to be moved backward to cause the periphery of the rollers to engage the friction flange 9.

In Figs. 1, 2 and 3, the propeller shaft 10 has a slight backward and forward movement. When it moves forward the cone friction devices 7 and 13 engage, and the propeller shaft is rotated in the direction to cause the boat to be driven forward, and as a consequence there is a forward push on the propeller shaft which causes the members 7 and 13 to be frictionally held together. When the propeller shaft is moved backward the flange 14 will engage the rollers 15 and force them backward, causing the opposite side of their peripheries to engage the inner side of the friction plate 9. The plate 9 being rotated by the engine, causes the friction wheels or rollers 15 to rotate, and transmits a reverse rotation to the propeller shaft through the flange 14, and the reverse movement of the propeller causes a backward pull on the propeller shaft which holds these friction members in engagement for driving the boat backward until the propeller shaft is moved in the opposite direction to disengage the said friction members. When the parts are in the neutral position shown in Fig. 1, the rotation of the engine-shaft is not transmitted to the propeller-shaft and the engine is therefore disconnected from the propeller, although the engine may continue to run.

A controlling lever 21 has its lower end pivotally supported by the casing 1, and engages a suitable yoke 23 attached to the propeller shaft. When the lever is in the forward position shown in Fig. 3, the friction members are in the position for driving the boat forward. When the lever is in an upright position the spring detent 24 is in engagement with a notch 25 formed in a segment 26, and the parts are held in a neutral position. When the lever is in the backward position shown in Fig. 4, the parts are in the position to reverse the propeller and cause the boat to move backward.

A modification is shown in Fig. 5, in which the propeller shaft is held against endwise movement. In this instance, the shaft 10 which carries the socket 11 at its inner end, has its outer end extended as shown at 10', which has an angular portion 27, which enters a socket 28, that is attached to the inner end of the propeller shaft 29, whereby the shaft 10 is capable of endwise movement independent of the propeller shaft, for the purpose of controlling the engagement of the friction driving devices, as previously described. The propeller shaft in this instance is held against endwise movement by means of suitable bearings 30 at the ends of a bearing step 31, which is attached to the bottom of the boat. When this arrangement is used, the angle of the cone-devices 7 and 13 are made at such an angle that they will stay in engagement when brought together by the movement of the lever 21, and the reversing mechanism is held in operative position as long as desired by the lever, which in ordinary operation is of course for only short periods.

Having thus described my invention, what I claim and desire to secure by Letters Patent, is:—

1. In a mechanism of the character described the combination with a driving shaft of go-ahead and backing friction members, a propeller shaft, an endwise movable member connected with the propeller shaft, go-ahead and backing friction members carried by the endwise movable member, a supporting spider, L-shaped members having their vertical arms projecting between said backing members and their horizontal arms longitudinally movable on said spider, and rollers carried by said vertical arms, the parts combined for the purpose described.

2. In a mechanism of the character described the combination with a driving shaft, of go-ahead and backing friction members, a propeller shaft, an endwise movable member connected with the propeller shaft, go-ahead and backing friction members carried by the endwise movable member, a supporting spider, L-shaped members carried by said spider having their vertical arms projecting between said backing members and their horizontal arms longitudinally movable, said longitudinal arms spring held out of engagement with either friction surface when the lever is in a neutral position by means of a stop, and rollers carried by said vertical arms, the parts combined to operate as and for the purpose described.

In testimony whereof I affix my signature in presence of two witnesses.

HAROLD B. ANDERSON.

Witnesses:
GERTRUDE M. LAVELLE,
W. J. WARD.

---

Copies of this patent may be obtained for five cents each, by addressing the "Commissioner of Patents, Washington, D. C."